United States Patent Office 3,375,250
Patented Mar. 26, 1968

3,375,250
CERTAIN ALKYL AND ARYL SUBSTITUTED
3 - AMINO - 2,3 - DIHYDRO - 4(1H)QUIN-
AZOLINONES
Frederick K. Kirchner, Bethlehem, and Andrew W.
Zalay, Albany, N.Y., assignors to Sterling Drug
Inc., New York, N.Y., a corporation of Delaware
No Drawing. Filed Nov. 17, 1961, Ser. No. 153,227
12 Claims. (Cl. 260—256.4)

This invention relates to new and useful heterocyclic compounds and to processes for their preparation.

In one of its aspects, the invention comprises 3-amino-2,3-dihydro-4-(1H)-quinazolinones of the formula

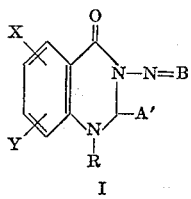

wherein:

N=B is a member of the group consisting of —N=A″ and —N=C=A‴;

R is a member of the group consisting of H, lower-alkyl, lower-alkenyl, cycloalkyl, cycloalkyl-lower-alkyl, monocarbocyclic-aryl, and monocarbocyclic-aryl-lower-alkyl;

A′, A″, and A‴ are each selected from the class consisting of:
  (1) any pair of the monovalent groups: H, lower-alkyl, lower-alkenyl, cycloalkyl, cycloalkyl-lower-alkyl, monocarbocyclic-aryl, and monocarbocycic-aryl-lower-alkyl; and
  (2) the divalent groups: polymethylene, azapolymethylene, N-lower-alkylazapolymethylene, oxapolymethylene, and thiapolymethylene, each containing from three to seven carbon atoms; and X and Y are members of the group consisting of H, lower-alkyl, lower-alkoxy, lower-alkylmercapto, lower-alkylsulfonyl, lower-alkylsulfoxy, halogen, and nitro.

In Formula I above, when A′ is a divalent group as defined, the compounds of the invention have a spiro substituent attached at the 2-position of the quinazolinone ring.

The divalent groups A′, A″, and A‴ defined above to be polymethylene, azapolymethylene, N-alkylazapolymethylene, oxapolymethylene, or thiapolymethylene containing from three to seven carbon atoms, can, for example, be trimethylene, tetramethylene, pentamethylene, hexamethylene, heptamethylene,

—CH₂—CH₂—O—CH₂—CH₂—

—CH₂—CH₂—S—CH₂—CH₂—

—CH₂—CH₂—NH—CH₂—CH₂—

—CH₂—CH₂—N(lower-alkyl)—CH₂—CH₂—

—CH₂—CH₂—CH₂—NH—CH₂—CH₂— and

—CH₂—C(CH₃)₂—NH—C(CH₃)₂—CH₂—

In Formula I above, in the definitions of R, A′, A″, and A‴, lower-alkyl is a straight- or branched-chain saturated acyclic hydrocarbon radical containing from one to six carbon atoms, for example, methyl, ethyl, n-propyl, n-butyl, isopropyl, isobutyl, sec.-butyl, tert.-butyl, n-amyl, and n-hexyl radicals.

In Formula I, in the definitions of R, A′, A″, and A‴, the lower-alkenyl group is a straight- or branched-chain acyclic hydrocarbon radical containing at least one double bond and having from two to six carbon atoms in the chain, for example, vinyl, allyl, propenyl, 2-butenyl, 3-methylpropenyl, methallyl, 2,4-pentadienyl, 3-hexenyl, and the like.

In Formula I above, in the definitions of R, A′, A″, and A‴, the cycloalkyl group is a saturated cyclic hydrocarbon radical containing from theree to eight ring carbon atoms, for example, cyclopropyl, cyclobutyl, cyclopentyl, cyclohexyl, 4-methylcyclohexyl, cycloheptyl, cyclooctyl, and the like.

In Formula I above, in the definitions of R, A′, A″, and A‴, the monocarbocyclic-aryl group is a radical of the benzene series and includes such groups as phenyl and phenyl substituted by low molecular weight inert substituents. The substituted phenyl radicals have preferably from one to three substituents which can be in any of the available positions of the phenyl nucleus, and where more than one substitutent is present, they can be the same or different and they can be in any of the various position combinations relative to each other. The substituents preferably have a molecular weight of less than about 150. The said inert substituents are lower-alkyl, lower-alkoxy, lower-alkylmercapto, lower-alkylsulfoxy, lower-alkylsulfonyl, halogen, nitro, carboxy, carbo-lower-alkoxy, hydrazido, trifluoromethyl and cyano, wherein lower-alkyl is as previously defined. Exemplary of monocarbocyclicaryl groups are phenyl, 4-bromophenyl, 2,4-dichlorophenyl, 3,4-dimethoxy, 4-tolyl, 4-trifluoromethylphenyl, 4-carboxyphenyl, 4-hydrazidophenyl, 2-chloro-4-bromophenyl, 3,4,5-trimethoxyphenyl, 4-nitrophenyl, 4-methylmercaptophenyl, 4-methylsulfonylphenyl, 4-cyanophenyl, 4-carboethoxyphenyl, 2-ethylsulfoxyphenyl, 3-iodophenyl, and 4-fluorophenyl.

The terms X and Y in Formula I can be the same or different and can be H, lower-alkyl, lower-alkoxy, lower-alkylmercapto, lower-alkanesulfoxy, lower-alkanesulfonyl, halogen, or nitro, wherein lower-alkyl is as defined above. The terms X and Y can be, for example, H, methyl, ethyl, n-propyl, isopropyl, n-butyl, isobutyl, tert.-butyl, n-amyl, n-hexyl, methoxy, ethoxy, methanesulfoxy, methanesulfonyl, ethanesulfonyl, chloro, bromo, fluoro, iodo, and nitro.

Monocarbocyclic-aryl-lower-alkyl, in the definitions of R, A′, A″, and A‴ in Formula I above, is a monocarbocyclic aryl radical as defined above, bonded through a divalent saturated acyclic hydrocarbon radical. Exemplary of monocarbocyclic-aryl-lower-alkyl radicals are benzyl, 4-chlorobenzyl, 3,4-dichlorobenzyl, phenylethyl, phenylpropyl, 4-methoxyphenylpropyl, 1-phenyl-1-ethyl, and the like.

In Formula I the cycloalkyl-lower-alkyl group is a cycloalkyl group as defined above bonded through a divalent saturated acyclic hydrocarbon radical, for example, cyclopropylmethyl, cyclobutylmethyl, cyclohexylethyl, and cyclooctylmethyl.

Pharmacological evaluation of the compounds of Formula I by standard pharmacological testing procedures has demonstrated that they possess pharmacodynamic activity. In particular, they have a potentiating effect upon the hypnosis produced by barbiturates, for example hexobarbital, which indicates their usefulness as adjuvants in the treatment of insomnia, convulsions, and mental disturbances.

Another aspect of the invention comprises the process for reacting a compound of the formula

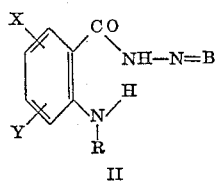

II with a compound of the formula A'=O, wherein R, A', N=B, X, and Y are as defined above. Cyclization of the anthranilic acid hydrazide with an aldehyde or ketone bonds the two secondary nitrogen atoms (shown in Formula II) through a common carbon atom, resulting in the formation of the quinazolinone ring.

Cyclization of anthranilic acid hydrazide itself, that is, the compound of Formula II wherein X and Y are each hydrogen and N=B is the primary amino radical, $NH_2$, with an aldehyde or ketone, A'=O, produces a 3-amino-2,3-dihydro-4(1H)-quinazolinone

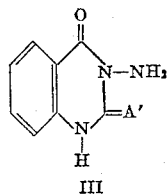

III and this compound can be reacted with an alkylating agent to produce a compound of Formula I wherein N=B is N=A", i.e.

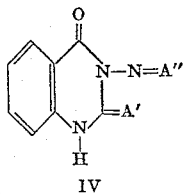

IV and with an aldehyde or ketone to produce compounds of Formula I wherein N=B is N=C=A''', i.e.

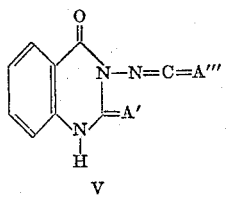

V

Alternatively, a substituted anthranilic acid hydrazide, wherein N=B in Formula II is a secondary- or tertiary-amino radical or an imino radical, can also be cyclized to produce the compounds of Formula I. For example, $N_1$-anthranilyl-$N_2$-benzal hydrazone,

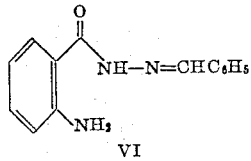

VI can be reacted with benzaldehyde to produce 2-phenyl-2,3-dihydro-3-benzalimino-4(1H)-quinazolinone.

When an anthranilic acid hydrazide of Formula II is reacted with a cyclic ketone, for example cyclohexanone or N-methylpiperidone, a 2 - spiro-2,3-dihydro-4(1H)-quinazolinone results.

When anthranilic acid hydrazide reacts with two molar equivalents of an aldehyde or ketone the corresponding alkylideneimino-2,3-dihydro-4(1H)-quinazolinone can be obtained directly.

Aldehydic and ketonic reactants containing additional functional substituents can be used in the reaction to produce compounds of the invention of a more varied nature. For example the reaction of anthraniloyl hydrazide with levulinic acid affords a product in which two cyclization reactions have taken place, that is,

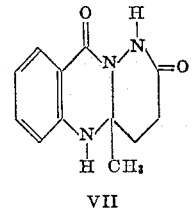

VII wherein the 3-[2-(2-methyl-2,3-dihydro-4(1H)-quinazolinyl)]-propionic acid which theoretically formed first recyclized with the formation of an internal hydrazide.

Similarly, anthranilic acid-N,N-dimethyl hydrazide can be reacted with levulinic acid to give the product in which a second cyclization has taken place with the secondary nuclear nitrogen, i.e.

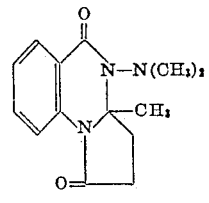

VIII

The anthranilic acid hydrazides, or anthraniloyl hydrazides, are obtained by standard methods by the reaction of hydrazine, hydrazine hydrate, or substituted hydrazines with isatoic anhydride or substituted isatoic anhydride, esters of anthranilic acid or substituted anthranilic acid, anthraniloyl halides or substituted anthraniloyl halides, or by the reduction of 2-nitrobenzoyl hydrazides or substituted 2-nitrobenzoylhydrazides.

Since many mono-substituted hydrazines other than phenylhydrazines are not readily available, it is convenient to prepare substituted anthraniloyl hydrazide by reduction of the appropriate anthraniloyl hydrazone resulting from the reaction of anthraniloyl hydrazide with an aldehyde or ketone. Thus, N-isopropylanthraniloyl hydrazide is conveniently prepared by reacting anthraniloyl hydrazide with acetone and reducing the resulting hydrazone with, for example, hydrogen over a platinum catalyst.

The cyclization of an anthraniloyl hydrazide with an aldehyde or ketone is carried out in a suitable inert solvent preferably in the presence of a catalytic quantity of a strong acid, for example, p-toluenesulfonic acid, hydrogen chloride, sulfuric acid, or their equivalents. Suitable inert solvents are for example the lower aliphatic alcohols, benzene, toluene, chloroform, and the like. In certain instances the reactant itself can serve as a solvent, as the case of acetone. The reaction proceeds well at the reflux temperature of the solvent, that is, from about 50° to about 150° C., and in most cases is complete within about two hours.

The structures of the compounds of the invention were determined by their method of synthesis and by infra-red spectral analysis and were corroborated by the correspondence of calculated and found values of elemental analyses of representative samples.

The following examples will further illustrate the invention without the latter being limited thereto.

*Example 1.—2,2-dimethyl-2,3-dihydro-3-anilino-4(1H) quinazolinone*

A solution containing 1.35 g. of anthraniloyl phenylhydrazide in 150 ml. of acetone was refluxed on a water bath for five hours. The crystals which separated from the cooled reaction mixture were recrystallized from acetone.

The pure 2,2-dimethyl-2,3-dihydro-3-anilino-4(1H)-quinazolinone thus prepared melted at 235.6–243.6° C. (corr.).

*Example 2.—2,2-pentamethylene-2,3-dihydro-3-anilino-4(1H)-quinazolinone*

A solution containing 8 g. of anthraniloyl phenylhydrazide, 5.2 ml. of cyclohexanone and a crystal of p-toluenesulfonic acid in 150 ml. of toluene was refluxed for one hour under a water trap. The crystals of 2,2-pentamethylene-2,3-dihydro-3-anilino - 4(1H) - quinazolinone which separated from the cooled reaction mixture melted at 230.4–243.0° C. (corr.).

*Example 3.—3-anilino-2,3-dihydro-4(1H)-quinazolinone*

A solution containing 9.6 g. of anthraniloyl phenylhydrazide and 3.5 ml. of 36 percent formalin solution in 200 ml. of methanol was refluxed for one-half hour. After removal of the solvent from the reaction mixture and crystallization of the resulting brownish oil from methanol, the product, 3-anilino-2,3-dihydro-4(1H)-quinazolinone, melted at 191.0–192.6° C. (corr.).

*Example 4.—6-bromo-2,2-dimethyl-3-anilino-2,3-dihydro-4(1H)-quinazolinone*

Following the procedure given in Example 1, 6-bromo-2,2 - dimethyl-3-anilino-2,3-dihydro-4(1H)-quinazolinone was prepared from 9.2 g. of 5-bromoanthraniloyl phenylhydrazide and 100 ml. of acetone containing a crystal of p-toluenesulfonic acid. The pure 6-bromo-2,2-dimethyl-3-anilino-2,3-dihydro-4(1H)-quinazolinone thus prepared melted at 234.6–238.4° C. (corr.).

*Example 5.—6-bromo-2,2-pentamethylene-3-anilino-2,3-dihydro-4(1H)-quinazolinone*

Following the procedure given in Example 2, 9.2 g. of 5-bromoanthraniloyl phenylhydrazide was reacted with 5.2 ml. of cyclohexanone in 150 ml. of benzene containing a crystal of p-toluenesulfonic acid. The pure 6-bromo-2,2-pentamethylene-3-anilino-2,3-dihydro - 4(1H) - quinazolinone, after recrystallization from acetone, melted at 216.4–217.6° C. (corr.).

*Example 6.—3-anilino-2-propenyl-2,3-dihydro-4(1H)-quinazolinone*

Following the procedure given in Example 3, 11.40 g. of anthraniloyl phenylhydrazide was reacted with 4.1 ml. of crotonaldehyde in 150 ml. of methanol. The crystals of 3-anilino-2-propenyl-2,3-dihydro - 4(1H) - quinazolinone which separated, after washing with methanol, melted at 186.4–195.0° C. (corr.).

*Example 7.—2,2-pentamethylene-3-cyclohexylidenamino-2,3-dihydro-4(1H)-quinazolinone*

Following the procedure given in Example 2, 15.2 g. of anthraniloyl hydrazide was reacted with 20.5 ml. of cyclohexanone and a crystal of p-toluenesulfonic acid in 150 ml. of toluene. The crystals of 2,2-pentamethylene-3-cyclohexylidenamino-2,3-dihydro - 4(1H) - quinazolinone which separated from the cooled reaction mixture, washed with toluene and ether, melted indefinitely starting at 183.4° C. (corr.).

*Example 8.—2,2-pentamethylene-3-cyclohexylamino-2,3-dihydro-4(1H)-quinazolinone*

A solution containing 15.35 g. of 2,2-pentamethylene-3-cyclohexylidenamino-2,3-dihydro - 4(1H) - quinazolinone dissolved in 700 ml. of methanol was hydrogenated for six hours at 60° over 1.5 g. of 10 percent palladium-charcoal. Upon evaporation of the filtered solution to 150 ml., crystals of 2,2-pentamethylene-3-cyclohexylamino-2,3-dihydro-4(1H)-quinazolinone separated which when recrystallized from methanol melted at 230.6–236.8° C. (corr.).

*Example 9.—2-phenyl-2,3-dihydro-3-benzalamino-4(1H)-quinazolinone*

A solution containing 7.56 g. of anthraniloyl hydrazide and 10.2 ml. of benzaldehyde in about 100 ml. of methanol was refluxed for about one-half hour. The yellow crystals of 2-phenyl - 2,3 - dihydro-3-benzalamino-4(1H)-quinazolinone which separated from the reaction mixture, after washing with methanol, melted at 158.6–161.4° C. (corr.).

*Example 10.—3-amino-2,3-dihydro-spiro[quinazoline-2, 4′-(1′-methyl)piperidine]-4(1H)-one*

A mixture of 15.2 g. of anthraniloyl hydrazide and 11.3 g. of 1 - methyl - 4 - piperidone was heated to 120°. The viscous solution which resulted was cooled to a resin and was crystallized from ether. After recrystallization from methanol-ether the white crystals of 3-amino-2,3-dihydro-spiro[quinazoline - 2,4′ - (1′ - methyl)piperidine]-4(1H)-one thus prepared melted at 176.4–178.0° C. (corr.).

*Example 11.—4-(2-aminobenzoylhydrazino)benzoic acid*

A solution containing 97.8 g. of isatoic anhydride and 91.2 g. of p-hydrazinobenzoic acid in 1 liter of 95 percent ethanol was refluxed for three hours. Upon the cooling of the reaction mixture 4-(2-aminobenzoylhydrazino)benzoic acid separated as slightly yellow crystals melting at 238–239° C.

*2,2-dimethyl-3-(4-carboxyanilino)-2,3-dihydro-4(1H) quinazolinone*

Following the procedure given in Example 1, a solution containing 27.13 g. of 4-(2-aminobenzoylhydrazino)-benzoic acid in 400 ml. of acetone was refluxed for four hours. After recrystallization from 50 ml. of acetone the pure 2,2 - dimethyl-3-(4 - carboxyanilino)-2,3-dihydro - 4 (1H)-quinazolinone thus prepared melted with decomposition at 278.6–281.0° C. (corr.).

*Example 12.—3-dimethylamino-2,3-dihydro-4(1H) quinazolinone*

Following the procedure given in Example 3, 17.92 g. of N,N-dimethylanthraniloyl hydrazide and 8.34 ml. of 36 percent formalin solution dissolved in 70 ml. of methanol was refluxed for one-half hour, giving 3-dimethylamino-2,3-dihydro-4(1H)-quinazolinone, which after recrystallization from benzene-hexane melted at 149.6–150.4° C. (corr.).

*Example 13.—2,2-dimethyl-3-dimethylamino-2,3-dihydro-4(1H)-quinazolinone*

Following the procedure given in Example 1, a solution containing 9 g. of N,N-dimethylanthraniloyl hydrazide and a crystal of p-toluenesulfonic acid in 50 ml. of acetone was refluxed for one-half hour to give 2,2-dimethyl-3-dimethylamino - 2,3 - dihydro-4(1H) - quinazolinone which after recrystallization from benzene and from methanol melted at 165.2–166.8° C. (corr.).

*Example 14.—2,2-pentamethylene-3-dimethylamino-2,3-dihydro-4(1H)-quinazolinone*

Following the procedure given in Example 2, a solution containing 9.2 g. of N,N-dimethylanthraniloyl hydrazide, 6.12 ml. of cyclohexanone, and a crystal of p-toluenesulfonic acid dissolved in 160 ml. of benzene was refluxed under a water separator until the calculated quantity of water was collected. The 2,2-pentamethylene-3-dimethylamino - 2,3 - dihydro-4(1H)-quinazolinone thus prepared, after two recrystallizations from methanol, melted at 201.8–203° C. (corr.).

*Example 15.—3-dimethylamino-2,3-dihydro-2-(4-nitrophenyl)-4(1H)-quinazolinone*

A solution containing 8.96 g. of N,N-dimethylanthraniloyl hydrazide and 7.55 g. of p-nitrobenzaldehyde in 100 ml. of methanol was refluxed for one-half hour. The crystals of 3 - dimethylamino-2,3-dihydro-2-(4-nitrophenyl)-4(1H)-quinazolinone which separated from the cooled solution, after washing with methanol, melted at 179.6–180.6° C. (corr.).

*Example 16.—2-(2,4-dichlorophenyl)-2,3-dihydro-3-dimethylamino-4(1H)-quinazolinone*

Following the procedure given in Example 15, 2-(2,4-dichlorophenyl) - 2,3 - dihydro-3-dimethylamino - 4(1H)-quinazolinone was prepared from 8.96 g. of N,N-dimethylanthraniloyl hydrazide and 8.75 g. of 2,4-dichlorobenzaldehyde. The pure 2-(2,4-dichlorophenyl)-2,3-dihydro-3-dimethylamino-4(1H)-quinazolinone thus prepared melted at 199.6–200.4° C. (corr.).

*Example 17.—2-(3,4-dimethoxyphenyl)-2,3-dihydro-3-dimethylamino-4(1H)-quinazolinone*

Following the procedure given in Example 15, 2-(3,4-dimethoxyphenyl)-2,3-dihydro-3-dimethylamino - 4(1H)-quinazolinone was prepared from 17.92 g. of N,N-dimethylanthraniloyl hydrazide and 16.6 g. of veratraldehyde. The pure 2-(3,4-dimethoxyphenyl)-2,3-dihydro-3-dimethylamino-4(1H)-quinazolinone melted at 151.4–152.0° C. (corr.).

*Example 18.—1,2-bis[2-(2-methyl-3-amino-2,3-dihydro-4(1H)-quinazolinonyl)]ethane*

Following the procedure given in Example 15, 1,2-bis [2 - (2 - methyl - 3 - amino - 2,3 - dihydro - 4(1H)-quinazolinonyl)]-ethane was prepared from 20.2 g. of anthraniloyl hydrazide and 15.7 ml. of 2,5-hexanedione in 50 ml. of methanol. The pure 1,2-bis[2-(2-methyl-3-amino-2,3-dihydro-4(1H)-quinazolinonyl)]-ethane melted at 170.8–171.6° C. (corr.).

*Example 19.—3-dimethylamino-2,3-dihydro-2-methyl-4 (1H)-quinazolinone*

A solution containing 8.95 g. of dimethylanthaniloyl hydrazide and 2.90 ml. of acetaldehyde in 90 ml. of absolute ethanol was heated in a stoppered bottle for three hours at about 85°. The cooled reaction mixture was treated with activated charcoal, and the solvent was evaporated. The residue was crystallized from benzene-pentane and recrystallized from methanol-water. The pure 3 - dimethylamino - 2,3 - dihydro-2-methyl-4(1H)-quinazolinone thus prepared melted at 165.2–166.8° C. (corr.).

*Example 20.—2,3-dihydro-3-isopropylamino-4(1H)-quinazolinone*

Following the procedure given in Example 3, 9.65 g. of N-anthraniloyl-N′-isopropylhydrazine was reacted with 4.17 ml. of 36 percent formalin solution in 30 ml. of methanol. The crystals which separated from the reaction mixture were recrystallized from methanol-water to give pure 2,3-dihydro-3-isopropylamino-4(1H) - quinazolinone melting at 167.6–169° C. (corr.).

*Example 21.—1,1-dimethyl-2-(2-methyl-aminobenzoyl)hydrazine*

A solution containing 17.7 g. of N-methylisatoic anhydride and 6.0 g. of 1,1-dimethylhydrazine in 50 ml. of methanol was refluxed until the evolution of carbon dioxide stopped (about one-half hour). The brown solution was treated with activated charcoal and concentrated to half its volume. The addition of water caused the product, 1,1-dimethyl-2-(2 - methylaminobenzoyl)hydrazine, to crystallize. Following recrystallization from heptane the pure 1,1-dimethyl-2-(2-methylaminobenzoyl) hydrazine melted at 120.4–121.2° C. (corr.).

*1-methyl-3-dimethylamino-2,3-dihydro-4(1H)-quinazolinone*

Following the procedure given in Example 3, 1-methyl-3-dimethylamino-2,3-dihydro - 4(1H) - quinazolinone was prepared from 3.25 g. of 1,1-dimethyl-2-(2-methylaminobenzoyl)-hydrazine and 1.39 ml. of 36 percent formalin solution. The pure 1-methyl-3-dimethylamino-2,3-dihydro- 4(1H)-quinazolinone, crystallized from methanol-water, melted at 86.4–88° C. (corr.).

*Example 22.—3-diethylamino-2,3-dihydro-4(1H)-quinazolinone*

Following the procedure given in Example 3, 10.36 g. of 1,1-diethyl-2-(2-aminobenzoyl)hydrazine (prepared from isatoic anhydride and N,N-diethylhydrazine) was reacted with 4.17 ml. of 36 percent formalin solution in 23 ml. of methanol. Recrystallized from methanol the pure 3-diethylamino - 2,3 - dihydro-4(1H)-quinazolinone melted at 110.0–111.0° C. (corr.).

*Example 23.—2,2-pentamethylene-2,3-dihydro-3-isonicotinoylamino-4(1H)-quinazolinone*

Following the procedure given in Example 2, 7.7 g. of anthraniloyl-N′-isonicotinoyl hydrazide was reacted with 4.1 ml. of cyclohexanone in 100 ml. of toluene. Recrystallized from methanol-ether, the pure 2,2-pentamethylene - 2,3 - dihydro - 3 - isonicotinoylamino - 4(1H)-quinazolinone thus prepared melted at 232.0–235.0° C. (corr.).

*Example 24.—2,2-dimethyl-2,3-dihydro-3-isonicotinoylamino-4(1H)-quinazolinone*

Following the procedure given in Example 1, 10.75 g. of N-anthraniloyl-N′-isonicotinoyl hydrazine was refluxed in 100 ml. of acetone for three hours in the presence of a crystal of p-toluenesulfonic acid. Recrystallized from methanol, the pure 2,2-dimethyl-2,3-dihydro-3-isonicotinoylamino-4(1H)-quinazolinone thus prepared melted at 250.4–252.0° C. (corr.).

*Example 25.—2,10-dioxo-4a-methyl-1,2,3,4,4a,5,10,10a-octahydropyridazino[3,2-b]quinazoline*

Following the procedure given in Example 2, 15.12 g. of anthraniloyl hydrazide, 11.62 g. of levulinic acid and a crystal of p-toluenesulfonic acid in 700 ml. of benzene were refluxed under a water trap. Recrystallized from absolute alcohol, the pure 2,10 - dioxo - 4a - methyl-1,2,3,4,4a,5,10,10a - octahydropyridazino - [3,2 - b]quinazoline melted at 194.2–196.0° C. (corr.).

*Example 26.—2,10-dioxo-3,4-benzo-1,2,4a,5,10,11-hexahydropyridazino-[3,2-b]quinazoline*

A solution containing 15.12 g. of anthraniloyl hydrazide and 15 g. of phthalaldehydic acid in 250 ml. of absolute alcohol were refluxed for three hours. The reaction solution was concentrated, and a yellow precipitate settled out. Recrystallized from tetrahydrofuran-hexane, the pure 2,10 - dioxo - 3,4 - benzo - 1,2,4a,5,10,11 - hexahydropyridazino-[3,2-b]quinazoline thus prepared melted at 240.2–244.6° C. (corr.).

*Example 27.—1,5-dioxo-4-dimethylamino-3a-methyl-1,2,3,3a-tetrahydropyrrolo-[1,2-a]quinazoline*

Following the procedure given in Example 2, 8.96 g. of 1,1-dimethyl-2-anthraniloyl hydrazide and 5.81 g. of levulinic acid were refluxed in 200 ml. of benzene under a water trap. When no more water was produced by the reaction, the reaction solution was filtered and evaporated under vacuum. The yellow oil which resulted was crystallized from ether. The 1,5-dioxo-4-dimethylamino - 3a - methyl - 1,2,3,3a - tetrahydrobromo-[1,2-a] quinazoline thus prepared melted at 189.2–190.0° C. (corr.).

*Example 28.—1-(2-aminobenzoyl)-2,2-dibenzylhydrazine*

Following the procedure given in Example 21, 1-(2-aminobenzoyl)-2,2-dibenzylhydrazine was prepared from 1,1-dibenzylhydrazine and isatoic anhydride. Crystallized from methanol the product melted at 150–155° C.

*3-dibenzylamino-2,3-dihydro-4(1H)-quinazolinone*

Following the procedure given in Example 3, 1-(2-aminobenzoyl)-2,2-dibenzylhydrazine was reacted with 35 percent formalin solution to give 3-dibenzylamino-2,3-dihydro-4(1H)-quinazolinone melting at 164–165° C.

*Example 29.—1-(2-aminobenzoyl)-2-methyl-2-phenylhydrazine*

Following the procedure given in Example 21, isatoic anhydride was reacted with 1-methylphenylhydrazine to give 1-(2-aminobenzoyl)-2-methyl-2-phenylhydrazine melting at 334–338° C.

*3-(N-methylanilino)-2,3-dihydro-4(1H)-quinazolinone*

1-(2-aminobenzoyl)-2-methyl-2-phenylhydrazine was reacted with 35 percent formalin solution, according to the procedure given in Example 3 to give 3-(N-methylanilino)-2,3-dihydro-4(1H)-quinazolinone.

*Example 30.—1-(4,5-dimethoxy-2-nitrobenzoyl)-2,2-dimethylhydrazine*

3,4-dimethoxyl-2-nitrobenzoyl chloride was reacted with 1,1-dimethylhydrazine in 50 ml. each of ether and chloroform to give 1-(4,5-dimethoxy-2-nitrobenzoyl)-2,2-dimethylhydrazine which, after recrystallization from methanol, melted at 220–221.2° C.

*1-(2-amino-4,5-dimethoxybenzoyl)-2,2-dimethylhydrazine*

Hydrogenation of 1-(4,5-dimethoxy-2-nitrobenzoyl)-2,2-dimethylhydrazine over platinum dioxide catalyst at room temperature afforded 1-(2-amino-4,5-dimethoxybenzoyl)-2,2-dimethylhydrazine.

*3-dimethylamino-6,7-dimethoxy-2,3-dihydro-4(1H)-quinazolinone*

Following the procedure given in Example 3, 1-(2-amino-4,5-dimethoxybenzoyl)-2,2-dimethylhydrazine was reacted with 35 percent formalin solution to give 3-dimethylamino-6,7-dimethoxy-2,3-dihydro-4(1H)-quinazolinone, which melted at 196–197° C. after recrystallization from benzene-ether.

*Example 31.—1-(2-amino-5-bromobenzoyl)-2-(2,5-dichlorophenyl)hydrazine*

6-bromoisatoic anhydride was reacted with 2,5-dichlorophenylhydrazine according to the method given in Example 21 to give 1-(2-amino-5-bromobenzoyl)-2-(2,5-dichlorophenyl)hydrazine, which melted at 191° C. after crystallization from benzene-ether.

*3-(2,5-dichloroanilino)-6-bromo-2,2-pentamethylene-2,3-dihydro-4(1H)-quinazolinone*

1-(2-amino-5-bromobenzoyl)-2-(2,5-dichlorophenyl)-hydrazine was reacted with cyclohexanone according to the procedure given in Example 2 to give 3-(2,5-dichloroanilino)-6-bromo-2,2-pentamethylene-2,3-dihydro-4(1H)-quinazolinone which melted at 263–266° C. after crystallization from benzene.

*Example 32.—1-(2-amino-5-bromobenzoyl)-2-(4-chlorophenyl)hydrazine*

Following the procedure given in Example 21, 6-bromoisatoic anhydride was reacted with 4-chlorophenylhydrazine to give 1-(2-amino-5-bromobenzoyl)-2-(4-chlorophenyl)hydrazine which melted at 178–180° C.

*3-(4-chloroanilino)-6-bromo-2,3-dihydro-2,2-pentamethylene-4(1H)-quinazolinone*

Following the procedure given in Example 2, cyclohexanone was reacted with 1-(2-amino-5-bromobenzoyl)-2-(4-chlorophenyl)hydrazine to give 3-(4-chloroanilino)-6-bromo-2,3-dihydro-2,2-pentamethylene-4(1H)-quinazolinone.

*Example 33.—1-(2-amino-5-bromobenzoyl)-2-(4-nitrophenyl)hydrazine*

6-bromoisatoic anhydride was reacted with 4-nitrophenylhydrazine according to the procedure given in Example 21 to give 1-(2-amino-5-bromobenzoyl)-2-(4-nitrophenyl)hydrazine which melted at 235° C.

*2-(2,4-dihydroxyphenyl)-6-bromo-3-(4-nitroanilino)-2,3-dihydro-4(1H)-quinazolinone*

1-(2-amino-5-bromobenzoyl)-2-(4-nitrophenyl)hydrazine was reacted with 2,4-dihydroxybenzaldehyde in 180 ml. of ethanol to give 2-(2,4-dihydroxyphenyl)-6-bromo-3-(4-nitroanilino)-2,3-dihydro-4(1H)-quinazolinone, which melted at 243° C. with decomposition.

*Example 34.—3-(4-carbethoxyanilino)-2,2-dimethyl-2,3-dihydro-4(1H)-quinazolinone*

Esterification of 2,2-dimethyl-3-(4-carboxyanilino)-2,3-dihydro-4(1H)-quinazolinone (Example 11) with ethanol in the presence of sulfuric acid gave 3-(4-carbethoxyanilino)-2,2-dimethyl-2,3-dihydro-4(1H)-quinazolinone.

*3-(4-hydrazidoanilino)-2,2-dimethyl-2,3-dihydro-4(1H)-quinazolinone*

The reaction of hydrazine hydrate with 3-(4-carbethoxyanilino)-2,2-dimethyl-2,3-dihydro-4(1H)-quinazolinone in ethanol gave 3-(4-hydrazidoanilino)-2,2-dimethyl-2,3-dihydro-4(1H)-quinazolinone which melted at 144° C.

*Example 35.—3-(4-nitroanilino)-2,2-dimethyl-6-bromo-2,3-dihydro-4(1H)-quinazolinone*

The reaction of 1-(2-amino-5-bromobenzoyl)-2-(4-nitrophenyl)hydrazine with acetone according to the procedure given in Example 1 gave 3-(4-nitroanilino)-2,2-dimethyl-6-bromo-2,3-dihydro-4(1H)-quinazolinone.

*Example 36.—3-isopropylidineamino-2,2-dimethyl-2,3-dihydro-4(1H)-quinazolinone*

Anthraniloyl hydrazide was reacted with excess acetone, following the procedure given in Example 1 to give 3-isopropylidineamino-2,2-dimethyl-2,3-dihydro-4(1H)-quinazolinone which melted at 243° C. after crystallization from ethanol.

*Example 37.—3-amino-2,2-pentamethylene-2,3-dihydro-4(1H)-quinazolinone*

Following the procedure given in Example 2, anthraniloyl hydrazide was reacted with cyclohexanone to give 3-amino-2,2-pentamethylene-2,3-dihydro-4(1H)-quinazolinone.

*Example 38.—3-dimethylamino-2,3-dihydro-spiro[quinazoline-2,4'-(1'-methyl)-piperidine]-4(1H)one*

Following the procedure given in Example 10, 3-dimethylamino-2,3-dihydro-spiro[quinazoline-2,4'-(1'-methyl)-piperidine]-4(1H)one was prepared from 1-methyl-4-piperidone and 1-(2-aminobenzoyl)-2,2-dimethylhydrazine. The product melted at 130–132° C. after crystallization from ether.

*Example 39.—3-(4-chloroanilino)-2,2-dimethyl-2,3-dihydro-4(1H)-quinazolinone*

The reaction of 1-(2-aminobenzoyl)-2-(4-chlorophenyl)hydrazine with acetone according to the procedure given in Example 1 gave 3-(4-chloroanilino)-2,2-dimethyl-2,3-dihydro-4(1H)-quinazolinone which melted at 225–228° C.

*Example 40.—3-(2,5-dichloroanilino)-2,2-dimethyl-2,3-dihydro-6-bromo-4(1H)-quinazolinone*

The reaction of 1-(2-amino-5-bromobenzoyl)-2-(2,5-dichlorophenyl)hydrazine with acetone according to the procedure given in Example 1 gave 3-(2,5-dichloroanilino)-2,2-dimethyl-2,3-dihydro-6-bromo-4(1H)-quinazolinone, M.P. 252° C.

Example 41.—3-(4-nitroanilino)-2,2-pentamethylene-6-bromo-2,3-dihydro-4(1H)-quinazolinone The reaction of 1-(2-amino-5-bromobenzoyl)-2-(4-nitrophenyl)hydrazine with cyclohexanone according to the procedure given in Example 2 gave 3-(4-nitroanilino)-2,2-pentamethylene - 6 - bromo - 2,3 - dihydro - 4(1H) - quinazolinone.

Example 42.—3-anilino-2-propyl-2,3-dihydro-4(1H)-quinazolinone

The reaction of anthraniloyl phenylhydrazine with n-butyraldehyde according to the procedure given in Example 3 gave 3-anilino-2-propyl-2,3-dihydro-4(1H)-quinazolinone, which melted at 202° C.

Example 43.—3 anilino-2,3-dihydro-spiro[quinazoline-2,4'-(2',2',6',6'-tetramethyl)piperidine]-4(1H)one Following the procedure given in Example 10, 2,2,6,6-tetramethyl-4-piperidinone was reacted with 2-anthaniloyl phenylhydrazine to give 3-anilino-2,3-dihydro-spiro[quinazoline - 2,4' - (2',2',6',6' - tetramethyl)piperidine] - 4 (1H)one.

Example 44.—1-cyclohexyl-2,2-dibenzyl-3-amino-2,3-dihydro-4(1H)quinazolinone Following the procedure given in Example 2, 1-cyclohexyl - 2,2 - dibenzyl - 3 - amino - 2,3 - dihydro - 4(1H) - quinazolinone can be prepared from 1-(2-cyclohexylaminobenzoyl)hydrazine and dibenzyl ketone. The 1-(2-cyclohexylaminobenzoyl)hydrazine can be prepared by reacting hydrazine hydrate with N-cyclohexylisatoic anhydride, which in turn can be prepared from isatoic anhydride and cyclohexyl bromide.

Example 45.—1-allyl-3-allylamino-2,3-dihydro-4(1H)-quinazolinone

Following the procedure given in Example 3, 1-allyl-3-allylamino-2,3-dihydro-4(1H)-quinazolinone can be prepared from 1-allyl-2-(2-allylaminobenzoyl)hydrazine and formaldehyde. The 1-allyl-2-(2-allylaminobenzoyl)hydrazine can be obtained from allylhydrazine and N-allylisatoic anhydride, which in turn can be prepared from isatoic anhydride and allyl bromide.

Example 46.—1-phenyl-2-cyclohexyl-2-propyl-3-benzylamino-2,3-dihydro-4(1H)-quinazolinone 1 - phenyl - 2 - cyclohexyl - 2 - propyl - 3 - benzylamino-2,3-dihydro-4(1H)-quinazolinone can be prepared from 1-benzyl-2-(2-anilinobenzoyl)hydrazine and cyclohexylpropyl ketone according to the procedure given in Example 2. The 1-benzyl-2-(2-anilinobenzoyl)hydrazine can be obtained from methyl 2-anilinobenzoate and benzylhydrazine.

Example 47.—1-(4-chlorobenzyl)-2,2-dicyclopropyl-3-(4-methylamino)2,3-dihydro-4(1H)-quinazolinone 1 - (4 - chlorobenzyl) - 2,2 - dicyclopropyl - 3 - (4-methylanilino)-2,3-dihydro-4(1H)-quinazolinone can be prepared from 1-(4-tolyl)-2-[2-(4-chlorobenzyl)aminobenzoyl]hydrazine and dicyclopropyl ketone according to the prodcedure given in Example 2. The 1-(4-tolyl)-2-[2-(4-chlorobenzyl)aminobenzoyl]hydrazine can be obtained from 4-chlorobenzylhydrazine and methyl 2-(4-methylanilino)benzoate.

Example 48.—1-(4-methylmercaptophenyl)-2,2-trimethylene-3-n-hexylamino-2,3-dihydro-4(1H)-quinazolinone 1 - (4 - methylmercaptophenyl) - 2,2 - trimethylene - 3-n-hexylamino-2,3-dihydro-4(1H)-quinazolinone can be prepared from cyclobutanone and 1-hexyl-2-[2-(4-methylmercaptoanilino)benzoyl]hydrazine according to the procedure given in Example 2. The 1-hexyl-2-[2-(4-methylmercaptoanilino)benzoyl]hydrazine can be prepared from methyl N - (4 - methylmercaptophenyl)anthranilate and n-hexylhydrazine.

Example 49.—2,2-hexamethylene-3-cycloheptylideneamino-6-nitro-2,3-dihydro-4-(1H)-quinazolinone The reaction of 5-nitroanthraniloyl hydrazide with excess cycloheptanone can be carried out to give 2,2-hexamethylene - 3 - cycloheptylideneamino - 6 - nitro - 2,3-dihydro-4(1H)-quinazolinone. The 5-nitroanthaniloyl hydrazide can be prepared from methyl 5-nitroanthranilate and hydrazine hydrate.

We claim:
1. A compound of the formula

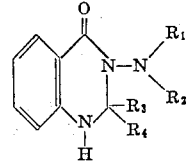

wherein $R_1$, $R_2$, $R_3$, and $R_4$ are lower-alkyl.

2. A compound of the formula

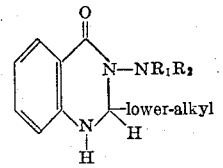

wherein $R_1$ and $R_2$ are lower-alkyl.

3. 3 - dimethylamino - 2,3 - dihydro - 2 - methyl- 4(1H) quinazolinone.

4. A compound of the formula

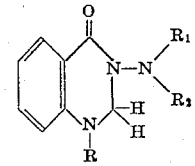

wherein R, $R_1$ and $R_2$ are lower-alkyl.

5. A compound of the formula

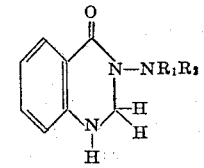

wherein $R_1$ and $R_2$ are lower-alkyl.

6. 3-dimethylamino-2,3-dihydro-4-(1H)quinazolinone.
7. 3-diethylamino-2,3-dihydro-4(1H)quinazolinone.
8. A compound of the formula

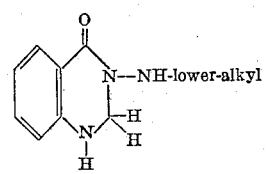

9. 2,3-dihydro-3-isopropylamino-4(1H)quinazolinone.
10. A compound of the formula

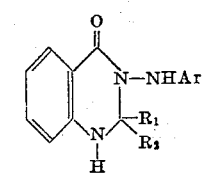

wherein Ar is a member of the class consisting of phenyl and phenyl substituted with from one to three substituents selected from the groups consisting of lower-alkyl, lower-alkoxy, lower-alkylmercapto, lower-alkylsulfoxy, lower-alkylsulfonyl, halo, nitro, carboxy, carbo-lower-alkoxy, hydrazido, trifluoromethyl, and cyano, and $R_1$ and $R_2$ are lower-alkyl.

11. A compound of the formula

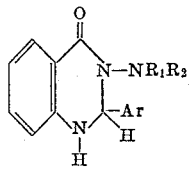

wherein Ar is a member of the class consisting of phenyl and phenyl substituted with from one to three substituents selected from the groups consisting of lower-alkyl, lower-alkoxy, lower-alkylmercapto, lower-alkylsulfoxy, lower-alkylsulfonyl, halo, nitro, carboxy, carbo-lower-alkoxy, hydrazido, trifluoromethyl, and cyano, and $R_1$ and $R_2$ are lower-alkyl.

12. 6 - bromo - 2,2 - dimethyl - 3 - anilino - 2,3 - dihydro-4(1H)-quinazolinone.

References Cited

Smith et al.: Tetrahedron, vol. 1, pp. 38–44 (1957).
Bogert: J. Am. Chem. Soc., vol. 32, pp. 784–92 (1910).
Dallacker: Monatsh. Chem., vol. 90, pp. 846–57 (1959).
Bohme et al.: Archiv Der Pharmazie, vol. 293, No. 11, pp. 1011–1020 (1960).
Burger: Medicinal Chemistry (New York, 1960), pp. 36–43.
Feldman et al.: Jour. Org. Chem., vol. 7, 1942, pp. 31–47.
Wertheim: Textbook of Org. Chem., Blakiston Co., Phil., 2nd ed., 1945, pp. 763–764.

NICHOLAS S. RIZZO, *Primary Examiner.*

D. M. McCUTCHEN, *Examiner.*

A. D. ROLLINS, M. O'BRIEN, R. J. GALLAGHER, *Assistant Examiners.*